United States Patent

Shelby, Jr.

[11] Patent Number: 5,328,132
[45] Date of Patent: Jul. 12, 1994

[54] ENGINE PROTECTION SYSTEM FOR RECOVERABLE ROCKET BOOSTER

[75] Inventor: Jerry A. Shelby, Jr., Huntsville, Ala.

[73] Assignee: General Dynamics Corporation, Space Systems Division, San Diego, Calif.

[21] Appl. No.: 53,281

[22] Filed: Apr. 28, 1993

[51] Int. Cl.⁵ .............................................. B64D 29/00
[52] U.S. Cl. .............................. 244/53 R; 244/129.1; 244/138 R
[58] Field of Search ............... 244/130, 129.1, 121, 244/138 R, 158 R, 160; 52/2.19, 2.14, 2.17

[56] References Cited

U.S. PATENT DOCUMENTS

| | | | |
|---|---|---|---|
| 3,332,176 | 7/1967 | Knetzen | 244/905 |
| 3,432,125 | 3/1969 | Schroeder, Jr. | 244/130 |
| 3,973,363 | 8/1976 | LaPorte et al. | 52/2.19 |
| 4,402,502 | 7/1984 | Schultz | 244/130 |
| 4,796,839 | 1/1989 | Davis | 244/160 |
| 4,830,314 | 5/1989 | Hujsak | 244/160 |
| 4,832,288 | 5/1989 | Kendall et al. | 244/138 R |
| 4,833,837 | 5/1989 | Bennean | 52/2.19 |
| 4,947,174 | 8/1990 | Lehman et al. | 244/121 |
| 4,961,550 | 10/1990 | Hujsak | 244/138 R |
| 5,083,728 | 1/1992 | Heck | 244/138 R |

Primary Examiner—Galen L. Barefoot
Attorney, Agent, or Firm—Frank D. Gilliam; John R. Dunca

[57] ABSTRACT

A rocket engine protection system for a recoverable rocket booster which is arranged to land in a salt water body in substantially a nose down attitude. The system includes an inflatable bag which is stowed on a portion of a flat annular rim of the aft skirt of the booster. The bag is hinged at opposing sides and is provided with springs that urge the bag open. The bag is latched in a stowed position during launch and prior to landing for recovery is unlatched to permit the bag to be urged open and into sealing engagement with the rim. A source of pressurized gas further inflates the bag and urges it into sealing engagement with the rim of the skirt where it is locked into position. The gas provides a positive pressure upon the interior of the bag to preclude entry of salt water into the skirt and into contact with the engine. A flotation arrangement may assist in precluding the skirt of the booster from becoming submerged.

20 Claims, 1 Drawing Sheet

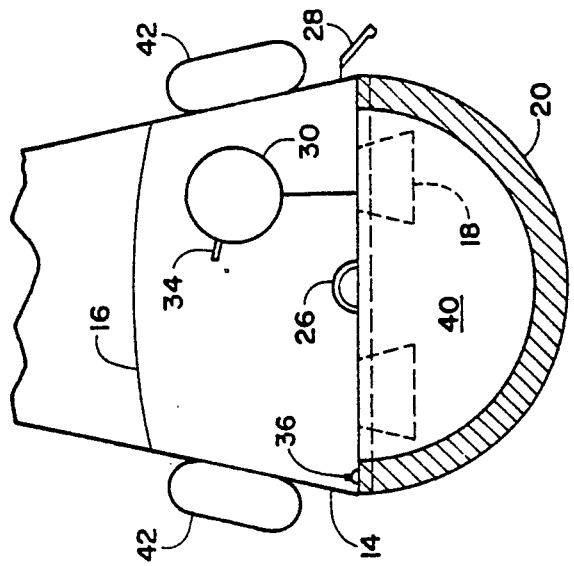
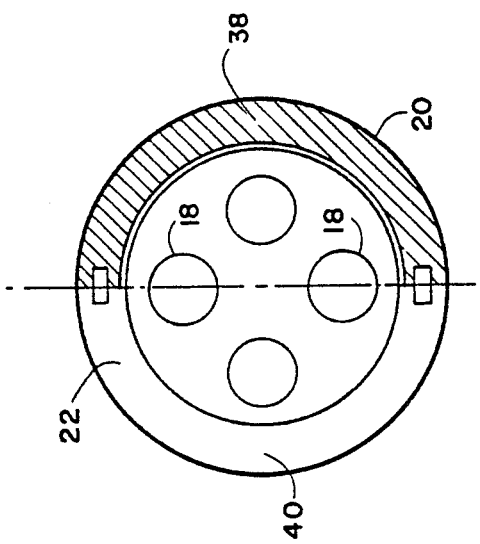
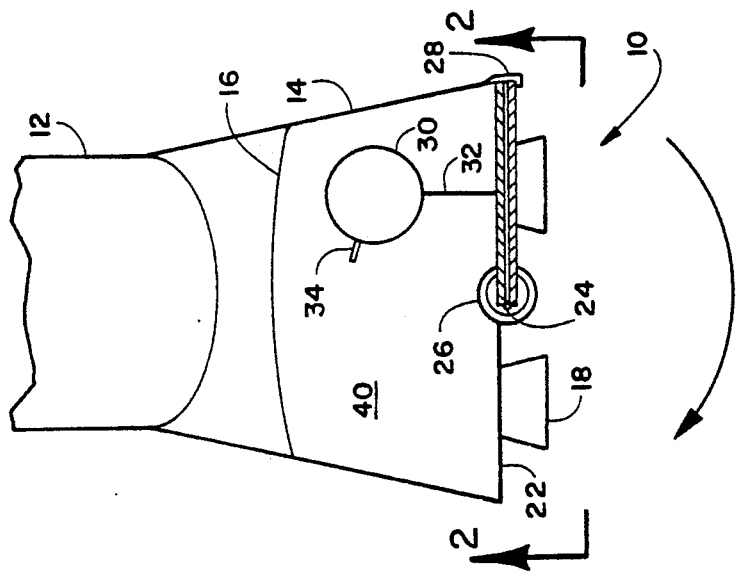

ENGINE PROTECTION SYSTEM FOR RECOVERABLE ROCKET BOOSTER

The invention described herein was made in performance of work under NASA Contract NAS8-3717 ad is subject to the provisions of Section 305 of the National Aeronautics and Space Act of 1958 (42 U.S.C. §2457).

BACKGROUND OF THE INVENTION

1. Field of the Invention

This invention relates to an improvement in space vehicles and more particularly, but not by way of limitation, to a deployable pressurizable bag to cover the aft end of the skirt of a recoverable rocket booster to preclude entry of salt water into the booster upon landing in a salt water body for recovery and thereby protect the rocket engine from damage.

2. Description of the Prior Art

It is well known in the art, to associate a number of solid and liquid rocket boosters and a space vehicle in order to launch a space vehicle or a payload into a desired orbit around the earth or other desired extra-terrestrial path. It is common to use solid rocket boosters and liquid propellant rocket boosters to propel the associated space vehicle to at least a desired first stage of travel. At present, after a launch an attempt is made only to recover, refurbish and reuse solid rocket boosters. The reason for this is that rocket boosters commonly descend into salt water bodies for recovery. Salt water damage to a solid rocket booster is considered to be of minor consequence since the relatively simple rocket motors of such boosters are completely rebuilt prior to reuse. However, in the instance of liquid propellant rocket boosters the crash damage to the rocket body and the subsequent entry of salt water into the thrust chambers and interior of the complex liquid propellant turbopumps render a liquid propellant rocket booster incapable of reuse without having first undergone expensive major overhaul.

Accordingly, it is of paramount importance if an attempt is to be made to reuse a liquid propellant rocket booster to protect the rocket engine from potential impact damage as the liquid rocket booster descends into a salt water body, such as an ocean, and to preclude resulting environmental damage to the engine prior to recovery of the rocket booster from the sea water. Failure to provide adequate protection from these dangers would render a liquid propellant rocket booster uneconomical to use in comparison to a solid rocket booster.

Past attempts at protecting a liquid propellant rocket from such damage have proved to be unsatisfactory. Such efforts have included large mechanically operated closures for the thrust end of the rocket engine. Such a closure was moved from a stowed position outboard of the booster to a deployed position so that the open end of the rocket engine would be sealed in the manner of sealing a jar with a lid.

These devices unfortunately are very heavy, involve complex mechanisms, and cause severe interface problems with the conventional means for securing a rocket booster and associated space vehicle to a launch pad. The problem of adequately protecting a liquid propellant rocket booster for recovery from a salt water body in a practical manner has not been provided by the prior art.

The present invention does provide a simple, low cost, lightweight practical solution to the problem of providing adequate protection for a liquid propellant rocket booster to enable reuse thereof after recovery from a salt water body.

The following patents, while of interest in the general field to which the invention pertains, do not disclose the particular aspects of the present invention that are of significant interest.

U.S. Pat. No. 4,961,550, assigned to the assignee of the present invention, is concerned with the same problem and discloses a rocket booster having a double walled skirt extension in which is disposed a water impermeable flexible sleeve means which extends from the booster after it has landed and is floating in sea water. The sleeve collapses against itself along its length and precludes migration of the sea water into the rocket engine and associated turbopumps. For a more complete description of the rocket booster, the disclosure of U.S. Pat. No. 4,961,550 is incorporated herein by reference.

U.S. Pat. No. 4,504,031 discloses an inflatable braking member that is deployed around a space vehicle by introducing gas into it. The braking member is jettisoned after the space vehicle leaves the atmosphere to enter a low earth orbit.

U.S. Pat. No. 4,638,947 relates to a rocket engine nozzle extension. A pneumatic bag within the fixed nozzle of a rocket engine is inflated to push and unfold the nozzle extension. After the nozzle extension is completely formed, the pneumatic bag may be jettisoned by firing the rocket engine.

U.S. Pat. No. 3,711,027 relates to an extendable nozzle for a rocket engine. The nozzle extension is deployable from a compactly stowed condition to an extended condition. A temporary jettisonable cover member is pressurized to unfurl the extendible nozzle and then is detached.

U.S. Pat. No. 3,482,783 relates to an inflatable rocket nozzle which includes pressure means that expand the inflatable nozzle when the rocket has risen to an altitude in the earth's atmosphere.

None of the prior art uncovered disclose an arrangement utilizing an inflatable pressurized bag to close the aft skirt of a liquid rocket in a water sealing engagement prior to the landing of the booster in sea water. This arrangement protects a liquid propellant booster rocket from crash damage and environmental damage for recovery of the rocket booster from a sea water landing so as to permit reuse thereof without major overhaul. None of these previous efforts, however, provides the benefits attendant with the present invention.

It is a general object of this invention to provide an improved arrangement for precluding crash damage and sea water damage to a liquid propellant rocket booster when the booster returns to a salt water body for recovery.

It is a further general object of the invention to provide an improved engine protection arrangement for a recoverable rocket booster which is practical, economical to produce and install, and which is lightweight.

It is a specific object of the invention to prove an engine protection arrangement which utilizes a deployable pressurizable bag to cover the aft end of the skirt of a recoverable rocket booster to preclude entry of salt water into the booster upon landing for a predetermined period of time to permit recovery.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. Briefly stated, a preferred embodiment of the invention provides an engine protection system for a rocket booster for a space vehicle that after launch is separable from the space vehicle and is adapted for landing in a salt water body for recovery and reuse. The engine protection system includes an inflatable water impermeable bag which is stowed against a portion of the flat rim of the aft skirt of the booster. The bag is hinged at opposing sides and has spring means which normally urge the bag to a deployed position. The bag is latched in its stowed position during launch and until just prior to landing. When deployment is desired, the latch is released and the spring urges the bag open. Substantially simultaneously, pressurized gas is released within the skirt to further urge the bag open and to inflate the bag into its deployed state to a generally half spherical shape. The bag, upon deployment, is securely locked against the full annular rim of the skirt to seal out water from entry thereinto. The pressurized gas provides a positive interior pressure to further preclude sea water entry for a time sufficient to permit recovery of the booster from the sea water. If the bag should be partially pierced upon deployment, the gas pressure assists in keeping sea water out of the skirt. A flotation means may be provided on the skirt to assist in keeping the aft portion of the booster from becoming submerged upon landing and while waiting for recovery.

The foregoing has outlined rather broadly the more pertinent and important features of the present invention in order that the detailed description of the invention that follows may be better understood so that the present contribution to the art may be more fully appreciated. Additional features of the invention will be described hereinafter which from the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompany drawings in which:

FIG. 1 is a diagrammatic cross-sectional view of the aft skirt of a rocket booster provided with a preferred embodiment of the engine protection arrangement of the instant invention;

FIG. 2 is an end view taken of the booster seen in FIG. 1.

FIG. 3 is a diagrammatic section of the arrangement illustrated in FIG. 1 and showing the engine protection system in its deployed position; and Similar numerals refer to similar parts in the various views.

DETAILED DESCRIPTION OF THE INVENTION

Referring now to the drawings in detail and in particular to FIG. 1, the reference character 10 generally designates an engine protection arrangement for a recoverable liquid propellant rocket booster constructed in accordance with a preferred embodiment of the present invention. The engine protection arrangement 10 is incorporated into a liquid rocket booster 12 having an aft skirt 14. As noted previously, the disclosure of U.S. Pat. No. 4,961,550 is incorporated by reference and shows the detail and arrangement of the various components of such a booster.

The interior of the skirt 14 is provide with a generally air tight sealed surface 16. The booster 12 is provided with suitable parachute means (not shown) which permit the rocket booster 12 after separation from a space vehicle and any associated other booster to approach a salt water body in a generally nose down attitude. By this, it is meant that the booster does not approach the water in a tail down attitude and it is preferred that the booster contact the water body generally at the point of separation from an associated booster by a suitable pyrotechnic arrangement, which point is approximately in the area of character A. For ease of illustration, only the nozzles 18 of the rocket engine are shown.

The engine protection system includes a suitable inflatable bag means which takes the form of a half spherical water impermeable bag 20 which is stowed on a portion of the flat annular lower rim 22 of the skirt 14. The portion of the bag 20 which is in contact with the rim 22 of the skirt 14 is in water sealing engagement. The bag is provided with opposing suitable hinge members 24 which permit the bag 20 to extend from a stowed position as seen in FIG. 1 to a fully deployed position as seen in FIG. 3. The hinge members 24 cooperate with suitable spring members 26 which urge the bag 20 to a fully deployed position.

A suitable electronically controlled latch 28 is carried on the outer surface of lower portion of the aft skirt 14 and maintains the bag in a stowed position during launch and precludes the spring members 26 from urging the bag toward a deployed position. As the booster 10 nears a salt water body and is disposed in a desired attitude for landing the latch 28 is released and the spring members 26 urge the bag toward a deployed state. Generally simultaneously with the opening of the bag 20 a source of pressurized gas is permitted to communicate with the interior of the aft skirt 14 to assist the bag 20 in being driven to a fully deployed position. In the illustrated embodiment of the invention, this source of pressurized gas takes the form of a tank 30 of a pressurized gas, such as nitrogen, which has a conduit 32 which is selectively permitted to communicate with the area of the interior of skirt 14 that is immediately adjacent to the bag 20. The tank 30 may also be provided with a valve 34 which may be actuated to permit the further escape of pressurized gas into the skirt 14 as will be more fully describe hereinafter.

As the bag 20 is deployed, a suitable locking means securely locks the bag 20 against the lower rim 22 of the skirt 14 in a water sealing engagement. This locking means may take the form of a locking device 36 which includes a male lock member 38 which is locked into female lock member 40 carried on the rim 22 of the skirt 14. As seen in FIG. 3, the bag 20 when is locked into a deployed position provides a half spherical bag that provides impact protection for the nozzles 18 of the rocket booster 12 and in addition to providing flotation assistance for the booster 12 after it has landed, provides a pressurized bag that is sealed against the rim 22 of the skirt 14 by the positive pressure provided by the pressurized gas emanating from valve 34 of the tank 30. The pressurized gas continues to flow from the tank 30 after landing for a suitable period of time, such as ninety minutes to provide a pressurized area 40 within the skirt 14 for protection of the engine of the booster 12.

As will be recognized, the material of the bag 20 is of sufficient strength and thickness to resist tearing or piercing during deployment or impact of the booster 12 upon landing. The bag 20 may also be provide with suitable reinforcement throughout or in the outer peripheral portion which will come into sealing contact with the rim 22 of the skirt 14. In the event that the bag 20 should be pierced upon deployment or impact the source of pressurized gas will continue to flow to provide a gas barrier against the entry of salt water into the protected area 40. As an additional assistance to flotation of the booster 12, the arrangement 10 may also include added flotation devices 42 which may be provided on the outer portion of the skirt 14 to assist in keeping the booster 12 afloat after landing and to preclude the bag 20 from being totally submerged.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. In a liquid rocket booster for a space vehicle that has a turbopump driven rocket engine and a parachute system which permits a controlled descent of the liquid rocket booster in a generally nose down attitude as it nears the earth for recovery in a salt water body after separation at a predetermined time from the space vehicle, which salt water body can cause impact damage and corrosion damage to the rocket engine, the improvement which comprises:

inflatable water impermeable bag means secured in a deflated state to at least a portion of the lower outer perimeter of a skirt surrounding components of the rocket engine including the nozzles;
   spring means in its normal state urging the bag means to a deployed state;
   actuable locking means to lock the bag means in a deflated state and in a deployed state; and
   actuable gas pressure means which is actuated when the lock means has released the bag means from its deflated state so that said spring means is permitted to urge the bag means from its state to a deployed state which permits the bag to sealingly extend against the full perimeter of the skirt and to be inflated by gas pressure from the gas pressure means thereby precluding entry of salt water into the rocket engine after the liquid rocket booster has landed in a salt water body.

2. The engine protection arrangement of claim 1 wherein the inflatable bag means is a half spherical shell which in its deflated state is disposed in a water sealing arrangement on a portion of the lower rim of the skirt surrounding the nozzles of the rocket engine.

3. The engine protection arrangement of claim 2 wherein the inflatable bag means is provided with opposing hinge means secured to the skirt whereby when the lock means releases the bag means from its deflated state the spring means urges the bag means into full sealing engagement with the outer lower perimeter of the skirt.

4. The engine protection arrangement of claim 3 wherein the locking means includes a latch which maintains the bag means in it deflated state during launch of the space vehicle and which is unlatched when as the liquid rocket booster nears a salt water body after separation from the space vehicle.

5. The engine protection arrangement of claim 4 wherein the locking means further includes having a first portion which is carried by a free end of the bag means which is urged, after release by the latch, into locking engagement with a second portion disposed on the lower rim of the skirt thereby locking the deployed bag into full sealing engagement therewith.

6. The engine protection arrangement of claim 3 wherein the spring means cooperates directly with the hinge means to urge the bag means into its deployed position when the electronic latch is released.

7. The engine protection arrangement of claim 2 wherein the gas pressure means is actuated as the bag means is being deployed and locked into position against the rim of the skirt by the locking means and to inflate the bag means into a half spherical shell configuration to provide a flotation impact bag for a liquid rocket booster.

8. The engine protection arrangement of claim 7 wherein the gas pressure means includes a source of pressurized gas which is selectively permitted to communicate with the interior of the skirt and the deployed bag means to close the aft end of the liquid rocket booster.

9. The engine protection arrangement of claim 8 wherein the pressurized gas is nitrogen.

10. A rocket engine protection arrangement for a recoverable rocket booster having an aft skirt provided with a planar lower annular rim that surrounds nozzles of a rocket engine which comprises:

inflatable water impermeable bag means stowed on a portion of the planar lower annular rim of the aft skirt;
    actuable means to urge the bag means to a deployed state in which it contacts the full annular rim of the skirt in a water sealing relationship, and actuable gas pressure means carried by the rocket booster which, upon deployment of the bag toward and against the rim of the skirt provides a continuing positive gas pressure within the skirt to expand the bag means to a generally hemispheric shape and to assist in precluding entry of salt water into the cavity of the skirt and thereby protect the rocket engine upon landing in a salt water body.

11. The rocket engine protection arrangement of claim 10 wherein the inflatable bag means is hinged at opposing sides and is folded against a portion of the rim of the skirt in a water sealing relationship and is adapted upon full inflation upon deployment to contact the full rim of the skirt in a water sealing relationship.

12. The rocket engine protection arrangement of claim 11 wherein the urging means are spring means which cooperate with the hinge means to urge the inflatable bag means from a stowed position to deployment against the rim of the skirt.

13. The rocket engine protection arrangement of claim 12 wherein the engine protection arrangement further includes lock means that secure the inflatable bag means in a stowed position and are released to permit the spring means to urge the bag means to a full deployment.

14. The rocket engine protection arrangement of claim 13 wherein the lock means includes a latch that secures the bag means in the stowed position and which is then unlatched to permit the spring means to urge the bag means to full deployment.

15. The rocket engine protection arrangement of claim 14 wherein the lock means further includes a means which cooperates with the bag means and the skirt of the rocket to securely lock the bag against the annular rim of the skirt.

16. The rocket engine protection arrangement of claim 10 wherein the gas pressure means is a source of pressurized gas that is carried within the booster and which is permitted to communicate with the aft portion of the interior of the skirt as the bag means is being deployed to assist in deployment and to pressurize the bag means before and after landing of the booster in a salt water body to preclude entry of salt water into the skirt and into contact with the engine.

17. The rocket engine protection arrangement of claim 16 wherein the source of pressurized gas is sufficient to provide a positive pressure within the inflatable bag means upon deployment for a predetermined period of time.

18. The rocket engine protection arrangement of claim 17 wherein the gas pressure means includes valve means and a separate controllable conduit connected between the source of pressurized gas and the aft portion of the skirt to permit selective communication of such source to the interior of the skirt and the deployed bag.

19. The rocket engine protection arrangement of claim 10 which further includes flotation means carried by the rocket booster at its aft portion to assist in keeping the skirt and inflated bag in its position from becoming totally submerged in sea water after landing in a sea water body.

20. The rocket engine protection arrangement of claim 19 wherein the flotation means includes flotation devices carried on opposing sides of the aft skirt of the booster.

* * * * *